US00RE42200E

(19) United States
(12) Reissued Patent
Welchko et al.

(10) Patent Number: US RE42,200 E
(45) Date of Reissued Patent: Mar. 8, 2011

(54) FAULT HANDLING OF INVERTER DRIVEN PM MOTOR DRIVES

(75) Inventors: Brian Welchko, Torrance, CA (US); Jonathan B. Huse, Rancho Santa Margarita, CA (US); Silva Hiti, Redondo Beach, CA (US); Brendan M. Conlon, Rochester Hills, MI (US); Constantin C. Stancu, Anaheim, CA (US); Khwaja M. Rahman, Troy, MI (US); David Tang, Fontana, CA (US); William R. Cawthorne, Milford, MI (US)

(73) Assignee: GM Global Technology Operations LLC, Detroit, MI (US)

(21) Appl. No.: 11/962,370

(22) Filed: Dec. 21, 2007

Related U.S. Patent Documents

Reissue of:
(64) Patent No.: 7,279,862
Issued: Oct. 9, 2007
Appl. No.: 11/462,432
Filed: Aug. 4, 2006

(51) Int. Cl.
*G05B 9/02* (2006.01)

(52) U.S. Cl. ..... 318/564; 318/565; 318/616; 318/563; 388/804; 361/23

(58) Field of Classification Search ..... 318/564, 318/565, 616, 563, 66; 363/89; 388/804; 361/23

See application file for complete search history.

(56) References Cited

U.S. PATENT DOCUMENTS 5,612,629 A * 3/1997 Mullin et al.
5,670,856 A * 9/1997 Le et al. ..... 318/564
5,687,049 A * 11/1997 Mangtani
5,757,599 A 5/1998 Crane
5,963,706 A * 10/1999 Baik (Continued)

OTHER PUBLICATIONS

Office Action dated Apr. 21, 2009, issued in U.S. Appl. No. 11/758,974.
Response to Office Action dated Jul. 16, 2009, filed in U.S. Appl. No. 11/758,974.
Notice of Allowance dated Sep. 25, 2009, issued in U.S. Appl. No. 11/758,974.

*Primary Examiner*—Paul Ip
(74) *Attorney, Agent, or Firm*—Ingrassia Fisher & Lorenz, P.C.

(57) ABSTRACT

An apparatus includes a multi-phase inverter, a fault detector to indicate a detection of a fault, a sensor to provide a speed signal indicative of whether a speed of a PM motor is greater than a transition speed, and a controller. The controller is operable to apply either an open-circuit response or a short-circuit response to the multi-phase inverter. The open-circuit response is applied when the speed of the PM motor is [greater] *less* than the transition speed and a fault is detected. The short-circuit response is applied when the speed of the PM motor is [less] *greater* than the transition speed and the fault is detected. The transition speed is either a fixed predetermined speed or an adjusted predetermined speed.

15 Claims, 4 Drawing Sheets

U.S. PATENT DOCUMENTS 6,118,238 A * 9/2000 Munro et al.
6,239,996 B1 * 5/2001 Perreault et al. ..... 363/89
6,392,418 B1 * 5/2002 Mir et al. ..... 324/503
6,476,996 B1 * 11/2002 Ryan
6,694,287 B2 * 2/2004 Mir et al.
6,741,060 B2 * 5/2004 Krefta et al. ..... 318/727
6,960,918 B2 * 11/2005 Hazelton
7,274,243 B2 9/2007 Pace et al.
7,279,862 B1 * 10/2007 Welchko et al.
7,339,803 B2 3/2008 Nojima
7,345,383 B2 * 3/2008 Zushi et al.
7,463,139 B2 * 12/2008 Burlak et al. ..... 340/468
7,545,111 B2 * 6/2009 Fu et al. ..... 318/400.23
2002/0145837 A1 * 10/2002 Krefta et al. ..... 361/23
2002/0176266 A1 * 11/2002 Perreaut et al. ..... 363/53
2003/0046028 A1 * 3/2003 Mir et al. ..... 702/183
2004/0024937 A1 2/2004 Duncan et al.
2004/0085787 A1 * 5/2004 Perreault et al. ..... 363/89
2004/0145838 A1 * 7/2004 Hazelton
2005/0253165 A1 11/2005 Pace et al.
2006/0044025 A1 3/2006 Grbovic
2006/0061923 A1 * 3/2006 Wang et al. ..... 361/23
2006/0245222 A1 11/2006 Najimia
2007/0103006 A1 * 5/2007 Zushi et al.
2008/0129238 A1 6/2008 Andersen
2008/0304189 A1 * 12/2008 Tang et al. ..... 361/333
2009/0059446 A1 * 3/2009 Matsui et al. ..... 361/31

* cited by examiner

FAULT HANDLING OF INVERTER DRIVEN PM MOTOR DRIVES

Matter enclosed in heavy brackets [ ] appears in the original patent but forms no part of this reissue specification; matter printed in italics indicates the additions made by reissue.

BACKGROUND

The present invention relates to permanent magnetic motor drives. In particular, the invention relates to procedures in such drives for handling faults when detected.

Three-phase voltage inverters are commonly employed to the control the magnitude and frequency of the motor phase currents in hybrid vehicles (including electric and fuel cell powered). When the ac motor used is of the class of interior permanent magnet (IPM) type, the reaction of the system to various inverter based faults is of concern since the fault may cause an uncontrolled breaking torque in the motor.

Drive system faults can be classified as short-circuit type faults and open-circuit type faults. The behavior of various faults in permanent magnetic motor drives has been reported in the literature for many years. Modeling and system behavior of short-circuit type faults are described in B. A. Welchko, T. M. Jahns, W. L. Soong, and J. M. Nagashima, "IPM synchronous machine drive response to symmetrical and asymmetrical short circuit faults," IEEE Trans. Energy Conversion, vol. 18, no. 2, pp. 291-298. June 2003.

For inverter driven IPM motors, an important class of open-circuit type faults results when the control gate signals to all of the six inverter switches are turned off, or disconnected. During this condition, the motor is connected to the dc source (e.g., battery, fuel cell, etc.) via the antiparallel diodes of the inverter switches. The antiparallel diodes create a potential path for current to flow which is dependant upon the motor operating condition and dc source voltage. The fault condition where the six gate signals have been turned off has been termed an uncontrolled generator mode (UCG mode) of operation since the motor would operate during the condition as a generator converting rotational power into electric currents. Modeling and system behavior during UCG mode operation is characterized in T. M. Jahns and V. Caliskan, "Uncontrolled Generator Operation of Interior PM Synchronous Machines Following High-Speed Inverter Shutdown," IEEE Trans. Industry Applications, vol. 35, no. 6, pp. 1347-1357, Nov./Dec. 1999.

SUMMARY OF THE INVENTION

In a method example of the invention, a method for controlling a multi-phase inverter of a PM motor includes detecting a fault, sensing whether a speed signal indicates that a speed of the PM motor is greater than a transition speed, and applying either an open-circuit or a short circuit response. The open-circuit response is applied when the speed of the PM motor is [greater] *less* than the transition speed when the fault is detected. The short-circuit is applied when the speed of the PM motor is [less] *greater* than the transition speed when the fault is detected. The transition speed is either a fixed predetermined speed or an adjusted predetermined speed.

In an apparatus example of the invention, the apparatus includes a multi-phase inverter, a fault detector to indicate a detection of a fault, a sensor to provide a speed signal indicative of whether a speed of a PM motor is greater than a transition speed, and a controller. The controller is operable to apply either an open-circuit response or short-circuit response to the multi-phase inverter. The open-circuit response is applied when the speed of the PM motor is [greater] *less* than the transition speed and a fault is detected.

The short-circuit response is applied when the speed of the PM motor is [less] *greater* than the transition speed and the fault is detected. The transition speed is either a fixed predetermined speed or an adjusted predetermined speed.

In a machine-readable medium example of the invention, the machine-readable medium includes sets of instructions operable in a controller to cause the controller to perform operations. The sets of instructions cause the controller to apply either an open-circuit response or a short-circuit response to a multi-phase inverter. An open-circuit response is applied when a speed signal from a sensor indicates that a speed of a PM motor is [greater] *less* than a transition speed when a fault is detected. A short-circuit response is applied when the speed signal indicates that the speed of the PM motor is [less] *greater* than the transition speed when the fault is detected. The transition speed is either a fixed predetermined speed or an adjusted predetermined speed.

BRIEF DESCRIPTION OF DRAWINGS

The invention will be described in detail in the following description of preferred embodiments with reference to the following figures.

DETAILED DESCRIPTION OF PREFERRED EMBODIMENTS

Embodiments of the present invention apply passive fault responses to inverters that differ depending on the rotational speed of the PM motor. After a fault, the residual control capacity of the faulted system is utilized to guide the system into a controlled fault response that globally minimizes the overall fault response characteristic of the system, for example, minimizing the uncontrolled breaking torque in the motor. As a result, the envelope of the faulted system response over the operating space is minimized, and the motor coasts to a stop at a controlled rate.

Figure 1:
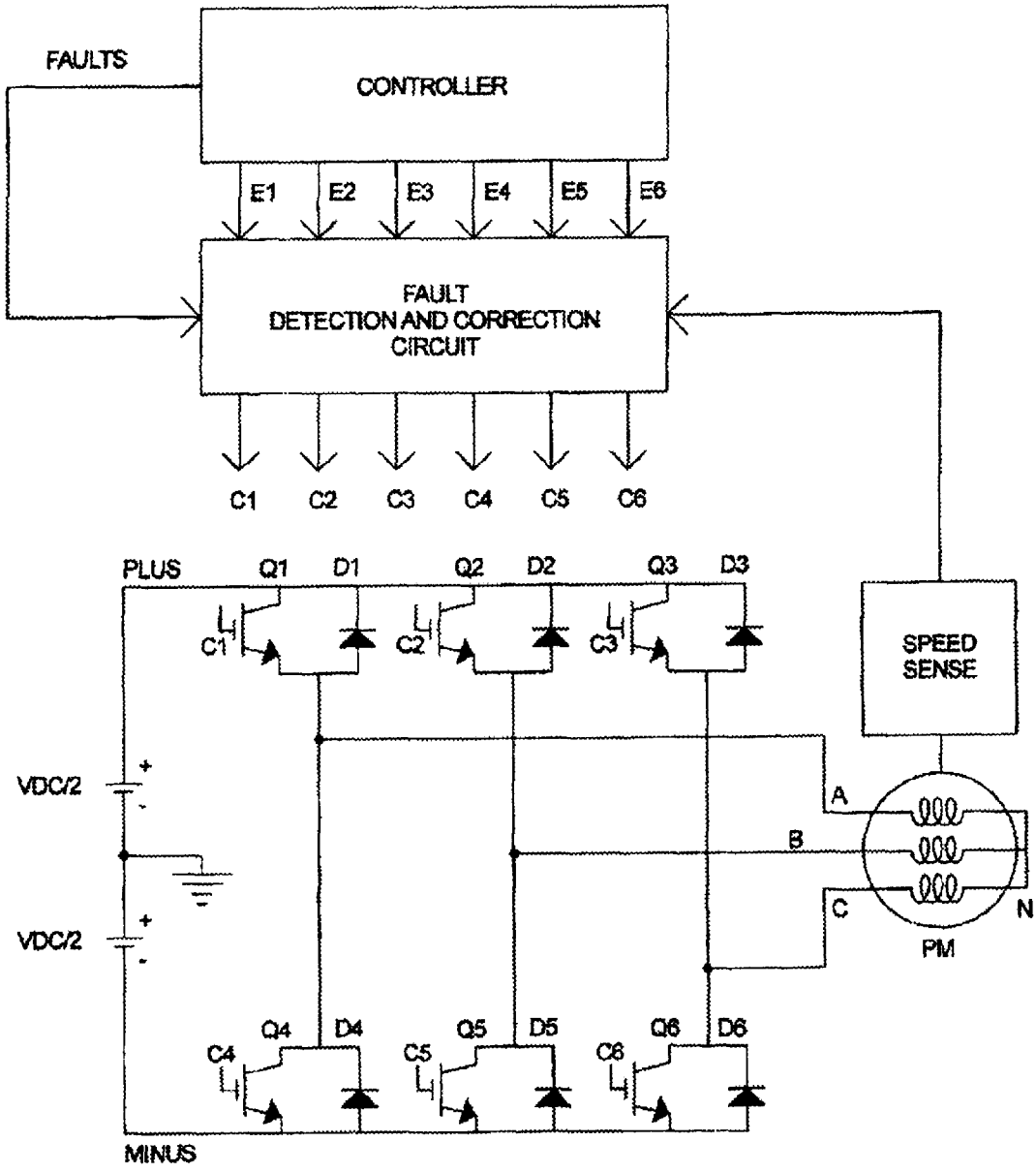
FIG. 1 is a schematic diagram of a circuit exemplifying the invention.

In FIG. 1, a circuit for controlling a multi-phase machine that has a stator with plural stator windings is depicted. The circuit includes a multi-phase inverter made from a connection of six commutation switches (Q1, D1), (Q2, D2), (Q3, D3), (Q4, D4), (Q5, D5) and (Q6, D6). The commutation switches are organized in pairs with each pair connected to a respective phase. Phase A is connected to both the first switch (Q1, D1) and the fourth switch (Q4, D4). Phase B is connected to both the second switch (Q2, D2) and the fifth switch (Q5, D5). Phase C is connected to both the third switch (Q3, D3) and the sixth switch (Q6, D6). The ends of the first, second and third switches that are not connected to any phase are connected to the PLUS bus. The ends of the fourth, fifth and sixth switches that are not connected to any phase are connected to the MINUS bus. The six switches are controlled by respective control inputs C1, C2, C3, C4, C5 and C6 to control respective commutation switches (Q1, D1), (Q2, D2), (Q3, D3), (Q4, D4), (Q5, D5) and (Q6, D6).

A speed sensor senses the rotational speed of permanent magnet motor PM and provides a signal characteristic of the rotational speed to the controller.

Controllers of the type used to control am multi-phase permanent magnet motor are frequently constructed around a micro-processor or equivalent. Other technologies might be used to mechanize a controller ranging from discrete components to application specific integrated circuits (ASICs) and everything between. Such a controller often has built in fault detection circuitry. Fault detection circuitry detects faults such as "out of limit" conditions, open and short circuit faults or even software faults. Faults may also be detected with separate circuits and reported to the controller as a fault signal. In any case, the fault is detected by a fault detector, whether the detector is external or internal to the controller.

For any fault requiring that the motor be shut down in a controlled manner, one of two fault responses are applied: an open-circuit fault response and a short-circuit fault response. The selection of response to be used depends on the rotational speed of the motor. For purposes of example, a transition rotational speed of about 7,000 rpm will be assumed for examples and embodiments discussed herein.

Figure 2:
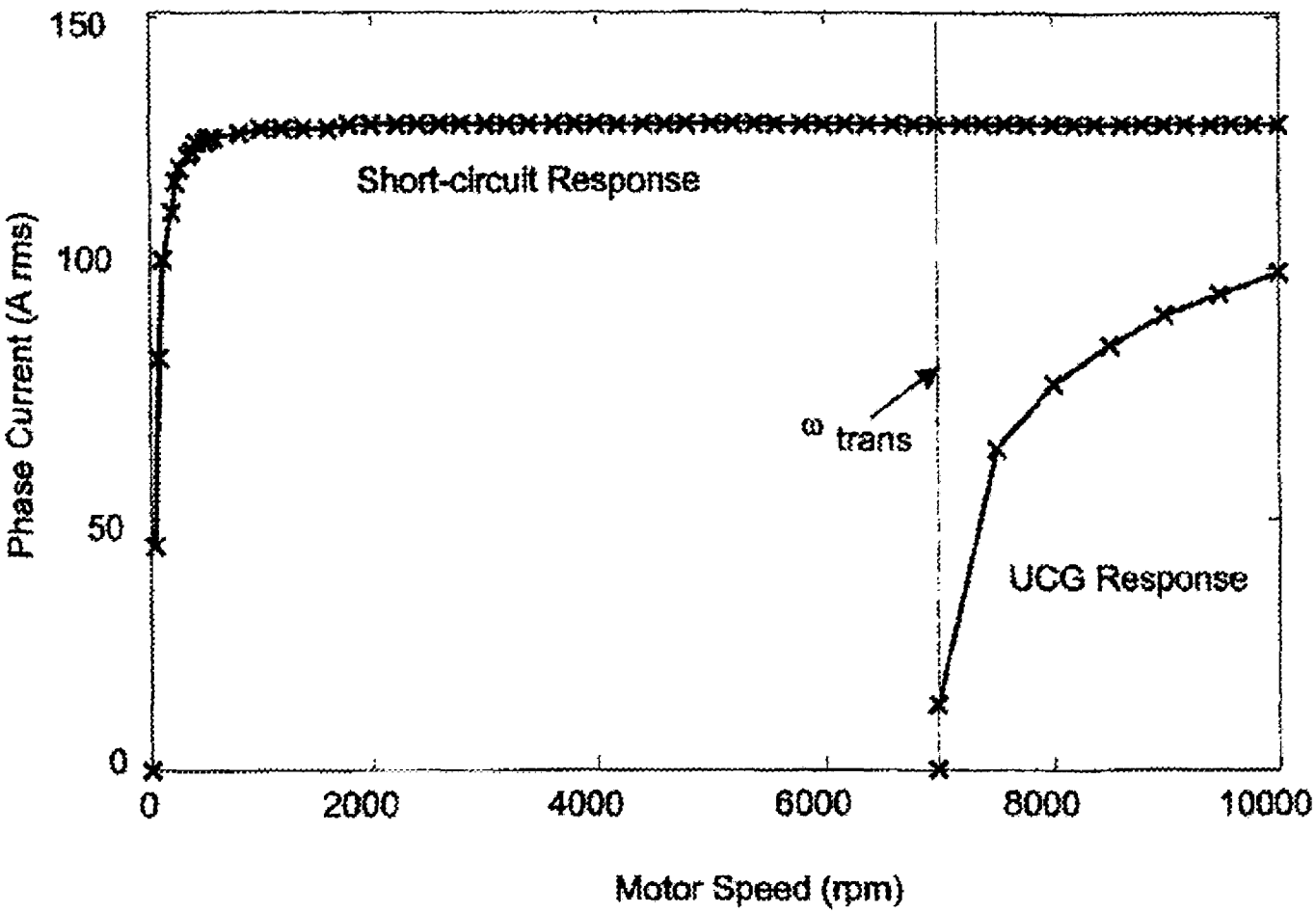
FIG. 2 is a graph depicting the phase current of a PM motor as a function of RPM for both the short-circuit response and the uncontrolled generator response as produced by the circuit of FIG. 1.
Figure 3:
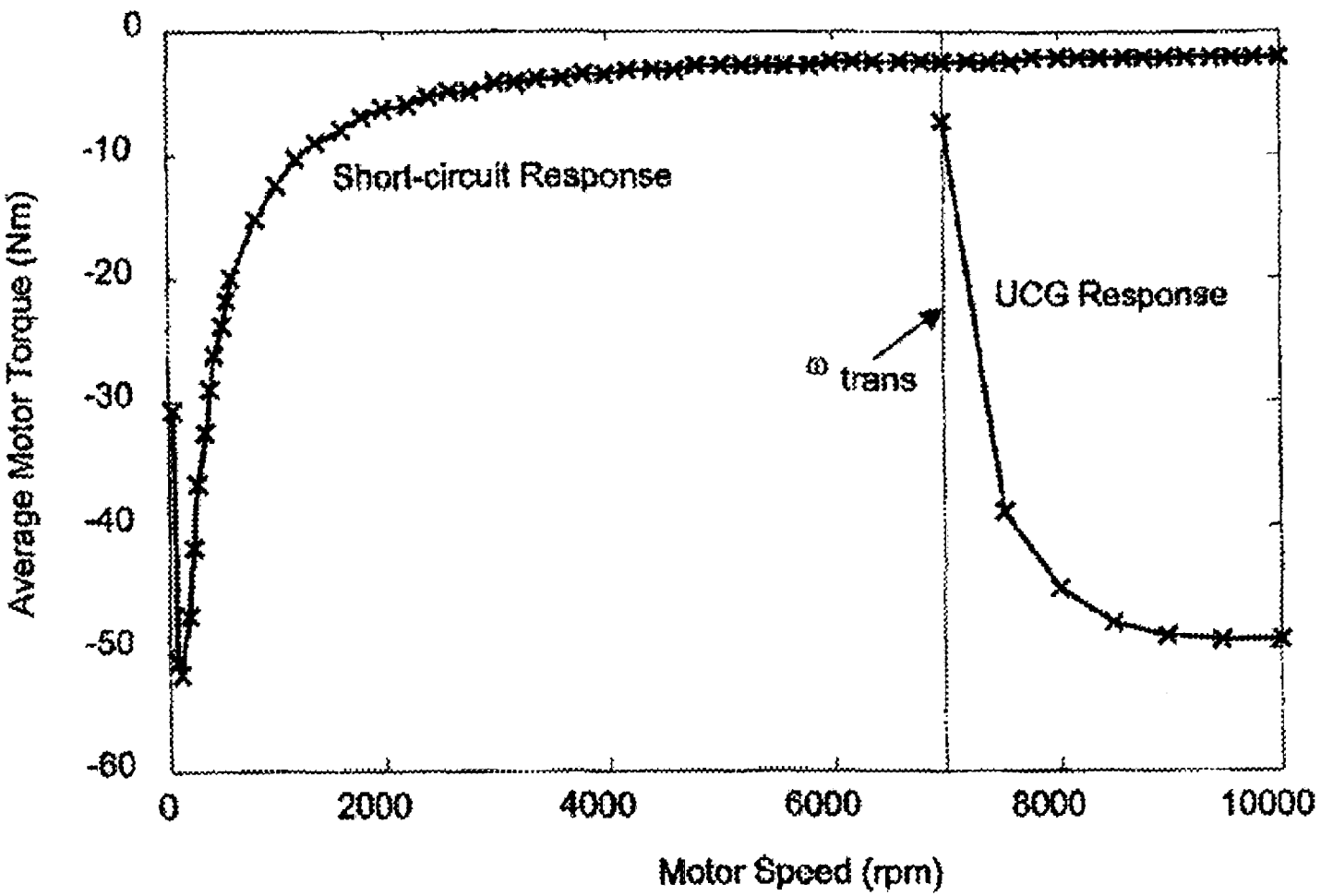
FIG. 3 is a graph depicting the torque of a PM motor as a function of RPM for both the short-circuit response and the uncontrolled generator response as produced by the circuit of FIG. 1.

When the motor rotates at rotational speeds below the transition speed, the controller mechanizes the open-circuit fault response by forcing all commutation switches (Q1, D1), (Q2, D2), (Q3, D3), (Q4, D4), (Q5, D5) and (Q6, D6) to be off (i.e., open circuit). With such a response, the motor is put into an uncontrolled generator mode (UCG mode); however, the motor generates no current (as depicted in FIG. 2) and produces no breaking torque (as depicted in FIG. 3) when the motor rotates at rotational speeds below the transition speed. On the other hand, if the motor were rotating at rotational speeds above the transition speed, the UCG mode generates increasingly more current (as depicted in FIG. 2) with increasing speed and produces increasingly more breaking torque (as depicted in FIG. 3) with increasing speed. Therefore, the controller avoids mechanizing the open-circuit fault response at motor rotation speeds above the transition speed. Instead, a short-circuit response is mechanized.

A short-circuit response is mechanized by forcing all commutation switches on the PLUS bus (Q1, D1), (Q2, D2)), and (Q3, D3) to be on (short circuit) while all commutation switches on the MINUS bus (Q4, D4), (Q5, D5) and (Q6, D6) are forced to be off (open circuit). Alternatively, the short-circuit response may be mechanized by forcing all commutation switches on the PLUS bus (Q1, D1), (Q2, D2) and (Q3, D3) to be off (open circuit) while all commutation switches on the MINUS bus (Q4, D4), (Q5, D5) and (Q6, D6) are forced to be on (short circuit). In either case, at motor rotation speeds below the transition speed, the short-circuit response generates increasing more current from the motor (as depicted in FIG. 2) as speed is increased from zero rpm and initially produces increasingly more breaking torque at low rpm but diminishing torque as the rpm approaches the transition speed (as depicted in FIG. 3).

Figure 4:
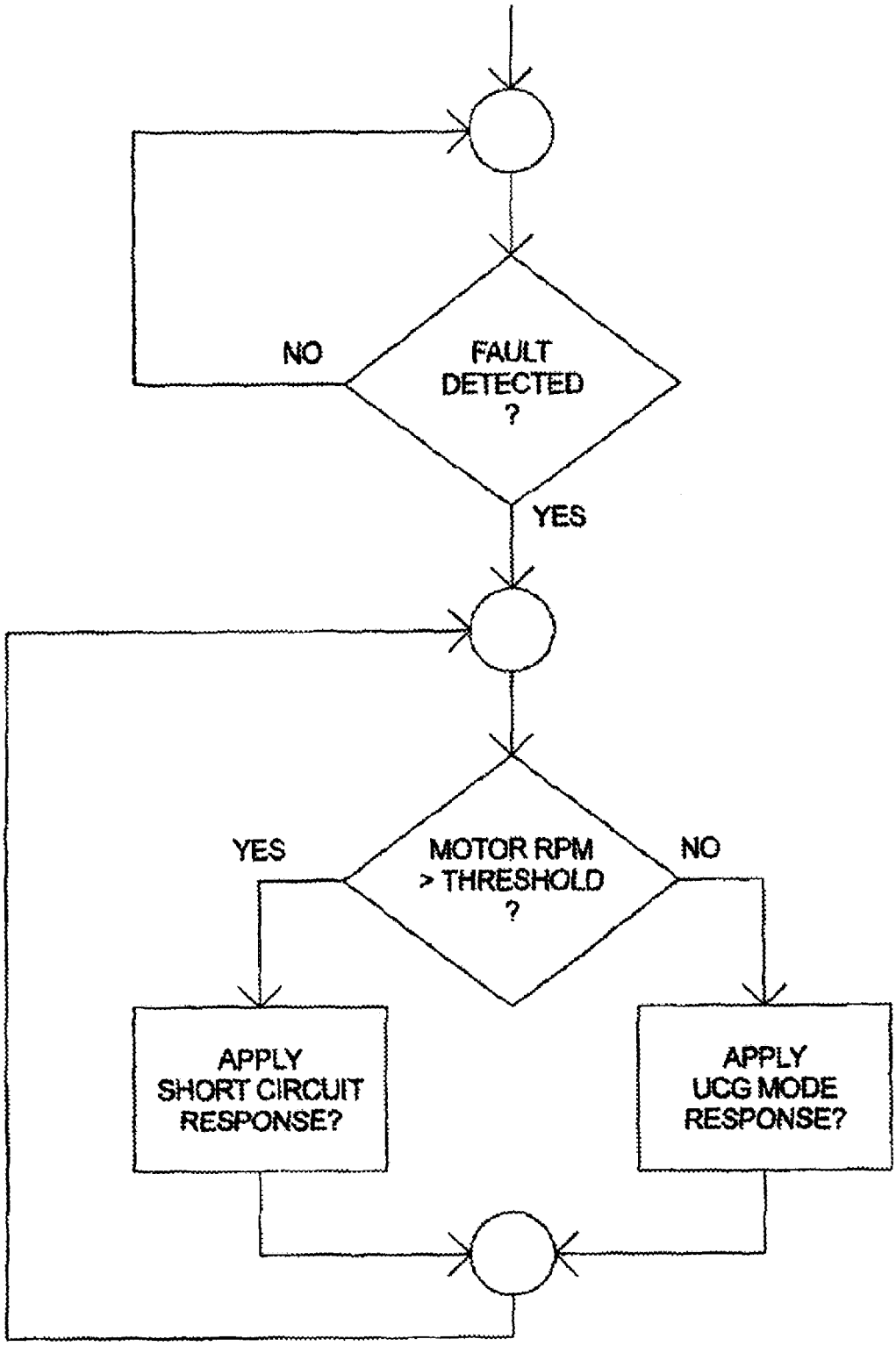
FIG. 4 is a flow chart of an exemplary method of the invention.

In an embodiment of a method, the method for controlling a multi-phase inverter of a PM motor being depicted in FIG. 4, the method includes detecting a fault and sensing whether a speed signal indicates that a speed of the PM motor is greater than a transition speed. The method further includes applying an open-circuit response when the speed signal indicates that the speed of the PM motor is [greater] *less* than the transition speed when the fault is detected, and applying a short-circuit response is applied when the speed signal indicates that the speed of the PM motor is [less] *greater* than the transition speed when the fault is detected. The transition speed is either a fixed predetermined speed or an adjusted predetermined speed.

In a first variant of the method embodiment, the applying the open-circuit response includes controlling all switches in the multi-phase inverter drive to be open.

In a second variant of the method embodiment, the applying the short-circuit response includes controlling selected switches in the multi-phase inverter drive to connect all phases of the multi-phase inverter to a single bus and controlling all other switches in the multi-phase inverter drive to be open.

In a third variant of the method embodiment, the transition speed is the fixed predetermined speed and is defined based on parameters characteristic of the PM motor.

In a fourth variant of the method embodiment, the transition speed is the adjusted predetermined speed and is defined based on parameters characteristic of the PM motor adjusted according to either a temperature of the PM motor, or a voltage of a voltage source, or both.

In an embodiment of an apparatus, the apparatus includes [am] *a* multi-phase inverter, a fault detector to indicate a detection of a fault, a sensor to provide a speed signal indicative of whether a speed of a PM motor is greater than a transition speed, and a controller. The controller is operable to apply an open-circuit response to the multi-phase inverter when the speed signal indicates that the speed of the PM motor is [greater] *less* than the transition speed and a fault is detected. The controller is additionally operable to apply a short-circuit response to the multi-phase inverter when the speed signal indicates that the speed of the PM motor is [less] *greater* than the transition speed and the fault is detected. The transition speed is either a fixed predetermined speed or an adjusted predetermined speed.

In a first variant of the apparatus embodiment, the application of the open-circuit response by the controller controls all switches in the multi-phase inverter to be open.

In a second variant of the apparatus embodiment, the application of the short-circuit response by the controller controls selected switches in the multi-phase inverter to connect all phases of the multi-phase inverter to a single bus and controls all other switches in the multi-phase inverter to be open.

In a third variant of the apparatus embodiment, the transition speed is the fixed predetermined speed and is defined based on parameters characteristic of the PM motor.

In a fourth variant of the apparatus embodiment, the transition speed is the adjusted predetermined speed and is defined based on parameters characteristic of the PM motor adjusted according to at least one of a temperature of the PM motor and a voltage of a voltage source.

In an embodiment of a machine-readable medium, the machine-readable medium includes sets of instructions operable in a controller to cause the controller to perform operations. The sets of instructions are operable to cause the controller to apply an open-circuit response to a multi-phase inverter when a speed signal from a sensor indicates that a speed of a PM motor is [greater] *less* than a transition speed when the fault is detected. The sets of instructions are further operable to cause the controller to apply a short-circuit response to the multi-phase inverter when the speed signal indicates that the speed of the PM motor is [less] *greater* than the transition speed when the fault is detected. The transition speed is either a fixed predetermined speed or an adjusted predetermined speed.

In a first variant of the machine-readable medium, the operator of applying the open-circuit response includes controlling all switches in the multi-phase inverter drive to be open.

In a second variant of the machine-readable medium, the operation of applying the short-circuit response includes controlling selected switches in the multi-phase inverter drive to connect all phases of the multi-phase inverter to a single bus and controlling all other switches in the multi-phase inverter drive to be open.

In a third variant of the machine-readable medium, the transition speed is the fixed predetermined speed and is defined based on parameters characteristic of the PM motor.

In a fourth variant of the machine-readable medium, the transition speed is the adjusted predetermined speed and is defined based on parameters characteristic of the PM motor adjusted according to at least one of a temperature of the PM motor and a voltage of a voltage source.

Having described preferred embodiments of a novel method, apparatus and media for handling faults of inverter driven PM motor drives (which are intended to be illustrative and not limiting), it is noted that modifications and variations can be made by persons skilled in the art in light of the above teachings. It is therefore to be understood that changes may be made in the particular embodiments of the invention disclosed which are within the scope of the invention as defined by the appended claims.

Having thus described the invention with the details and particularity required by the patent laws, what is claimed and desired protected by Letters Patent is set forth in the appended claims.

What is claimed is:

1. A method for controlling a multi-phase inverter of a PM motor comprising:

detecting a fault[:];

sensing whether a speed signal indicates that a speed of the PM motor is greater than a transition speed;

applying an open-circuit response when the speed of the PM motor is [greater] *less* than the transition speed when the fault is detected; and applying a short-circuit response when the sped of the PM motor is [less] *greater* than the transition speed when the fault is detected, wherein the transition speed is one of a fixed predetermined speed and an adjusted predetermined speed.

2. A method according to claim 1, wherein the applying the open-circuit response includes controlling all switches in the multi-phase inverter drive to be open.

3. A method according to claim 1, wherein the applying the short-circuit response includes controlling selected switches in the multi-phase inverter drive to connect all phases of the multi-phase inverter to a single bus and controlling all other switches in the multi-phase inverter drive to be open.

4. A method according to claim 1, wherein the transition speed is the fixed predetermined speed and is defined based on parameters characteristic of the PM motor.

5. A method according to claim 1, wherein the transition speed is the adjusted predetermined speed and is defined based on parameters characteristic of the PM motor adjusted according to at least one of a temperature of the PM motor and a voltage of a voltage source.

6. An apparatus comprising:

a multi-phase inverter;

a fault detector to indicate a detection of a fault;

a sensor to provide a speed signal indicative of whether a speed of a PM motor is greater than a transition speed; and a controller operable to apply an open-circuit response to the multi-phase inverter when the speed of the PM motor is [greater] *less* than the transition speed and a fault is detected, and additionally operable to apply a short-circuit response to the multi-phase inverter when the speed of the PM motor is [less] *greater* than the transition speed and the fault is detected, wherein the transition speed is one of a fixed predetermined speed and an adjusted predetermined speed.

7. An apparatus according to claim 6, wherein the application of the open-circuit response by the controller controls all switches in the multi-phase inverter to be open.

8. An apparatus according to claim 6, wherein the application of the short-circuit response by the controller controls selected switches in the multi-phase inverter to connect all phases of the multi-phase inverter to a single bus and controls all other switches in the multi-phase inverter to be open.

9. An apparatus according to claim 6, wherein the transition speed is the fixed predetermined speed and is defined based on parameters characteristic of the PM motor.

10. An apparatus according to claim 6, wherein the transition speed is the adjusted predetermined speed and is defined based on parameters characteristic of the PM motor adjusted according to at least one of a temperature of the PM motor and a voltage of a voltage source.

11. A machine-readable medium comprising sets of instructions operable in a controller to cause the controller to perform operations comprising:

applying an open-circuit response to a multi-phase inverter when a speed signal from a sensor indicates that a speed of a PM motor is [greater] *less* than a transition speed when a fault is detected; and applying a short-circuit response to the multi-phase inverter when the speed signal indicates that the speed of the PM motor is [less] *greater* than the transition speed when the fault is detected, wherein the transition speed is one of a fixed predetermined speed and an adjusted predetermined speed.

12. A machine-readable medium according to claim 11, wherein the operation of applying the open-circuit response includes controlling all switches in the multi-phase inverter drive to be open.

13. A machine-readable medium according to claim 11, wherries the operation of applying the short-circuit response includes controlling selected switches in the multi-phase inverter drive to connect all phases of the multi-phase inverter to a single bus and controlling all other switches in the multi-phase inverter drive to be open.

14. A machine-readable medium according to claim 11, wherein the transition speed is the fixed predetermined speed and is defined based on parameters characteristic of the PM motor.

15. A machine-readable medium according to claim 11, wherein the transition speed is the adjusted predetermined speed and is defined based on parameters characteristic of the PM motor adjusted according to at least one of a temperature of the PM motor and a voltage of a voltage source.

* * * * *